(12) United States Patent
Isogawa

(10) Patent No.: US 6,540,624 B1
(45) Date of Patent: Apr. 1, 2003

(54) PRINTING INK GOLF BALL, PRINTING METHOD USING THE SAME, AND GOLF BALL PRINTED USING THE SAME

(75) Inventor: Kazuhiko Isogawa, Kobe (JP)

(73) Assignee: Sumitomo Rubber Industries Limited, Kobe (JP)

( * ) Notice: Subject to any disclaimer, the term of this patent is extended or adjusted under 35 U.S.C. 154(b) by 0 days.

(21) Appl. No.: 09/503,247

(22) Filed: Feb. 14, 2000

(30) Foreign Application Priority Data

Feb. 17, 1999 (JP) .......................................... 11-039214
Dec. 6, 1999 (JP) .......................................... 11-346290

(51) Int. Cl.[7] .......................... A63B 37/04; A63B 37/06; G09F 3/00
(52) U.S. Cl. .......................... 473/371; 473/351; 40/327
(58) Field of Search .............................. 473/371, 409; 525/193; 40/327; 106/31.13

(56) References Cited

U.S. PATENT DOCUMENTS

| | | | |
|---|---|---|---|
| 4,271,258 A | * | 6/1981 | Watariguchi ................ 106/31.6 |
| 5,160,536 A | | 11/1992 | Harris et al. |
| 5,391,685 A | * | 2/1995 | Hitomi et al. ................ 522/120 |
| 5,589,546 A | * | 12/1996 | Hiraka et al. ................ 525/193 |
| 5,785,612 A | * | 7/1998 | Shapiro et al. ................ 40/327 |
| 5,878,670 A | * | 3/1999 | Yamaguchi ................ 101/492 |
| 6,191,185 B1 | * | 2/2001 | Keller ................ 522/81 |

FOREIGN PATENT DOCUMENTS

JP    5112746    5/1993

* cited by examiner

Primary Examiner—Paul T. Sewell
Assistant Examiner—Alvin A. Hunter, Jr.
(74) Attorney, Agent, or Firm—Birch, Stewart, Kolasch & Birch, LLP

(57) ABSTRACT

The present invention provides ink for golf ball that can be used in printing a mark directly on a cover made from ionomer resin, without the need for a primer coat, while ensuring high durability. The printing ink comprises an acrylic resin and a coloring agent. A golf ball having a durable mark printed thereon and a method of printing a mark efficiently on a surface of a ball body by using the ink are also provided.

18 Claims, 2 Drawing Sheets

PRINTING INK GOLF BALL, PRINTING METHOD USING THE SAME, AND GOLF BALL PRINTED USING THE SAME

This application is based on patent application Nos. 11-39214 and 11-346290 filed in Japan, the contents of which is hereby incorporated by reference.

BACKGROUND OF THE INVENTION

1. Field of the Invention

The present invention relates to an ink that prints on the surface of the golf ball body without the need for a primer coat and forms marks having high durability, a printing method using the same, and a golf ball printed using the same.

2. Description of the Related Art

When a mark such as trade mark or other identifying indicia is to be printed on an outer surface of the golf ball body with the prior art, a white paint is applied as a primer coat to the outer surface of the golf ball body followed by printing of the mark thereon, then a clear coat, usually transparent, commonly called a finish coat, is applied to the surface of the printed ball to protect the printed mark and improve the appearance of the golf ball. Due to the recent technological advancements, the number of applications is required to decrease. The primer coat tends to be eliminated in order to meet the requirement.

When the mark is directly printed on a surface of the cover made from a resin such as ionomer resin using conventional ink, however, there has been such a problem that ink does not adhere well to the ionomeric cover, thus resulting in insufficient durability of the printed mark. In order to solve this problem, a printing ink containing nitrocellulose to improve the adhesion to the ionomeric cover is suggested in Japanese Unexamined Patent Publication No. 5-112746. The printing ink adheres well not only to the ionomeric cover, but also to clear coat formed on the printed ink (i.e. mark), resulting in such a problem that the mark defined by ink disappears with clear coat due to wear or scaling.

SUMMARY OF THE INVENTION

An object of the present invention is to provide an ink for golf ball that can be used in printing of a mark directly on a cover made from ionomer resin without the need for a primer coat, and suppress excessive adhesion to clear coat formed on the mark while ensuring high durability of the mark, and to provide a golf ball having a durable mark printed thereon.

Another object of the present invention is to provide a method of printing a mark efficiently on a surface of a golf ball body using ink described above.

The present invention provides a printing ink for golf ball comprising an acrylic resin and a coloring agent.

The present invention also provides a golf ball comprising a ball body and a mark printed on a surface of a ball body. The mark is defined by ink comprising an acrylic resin and a coloring agent.

The present invention further provides a printing method, which comprises the steps of: transferring an ink to a pad, and printing a mark on a surface of a ball body with the inked pad. The ink comprises an acrylic resin and a coloring agent.

The term "mark" as used in the invention means and includes a trademark and other identifying indicia.

These and other objects, features, aspects, and advantages of the present invention will become more apparent from the following detailed description of the preferred embodiments/examples.

DESCRIPTION OF THE PREFERRED EMBODIMENTS

Figure 1:
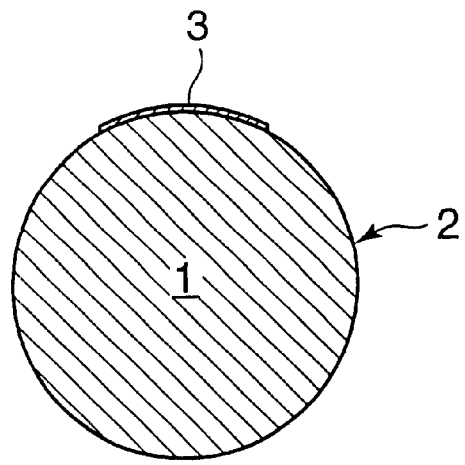
FIG. 1 is a cross sectional view illustrating golf ball of the present invention.

The present inventors completed this invention upon finding that the objects described above could be achieved by using acrylic resin as a film forming ingredient, the so-called carrier for coloring agent, in a printing ink, after researching on the ink for golf ball that can be printed directly on a surface of a cover made from ionomer resin or the like without the need for a primer coat and is capable of controlling the adhesion with the clear coat applied over the mark, while ensuring high durability of the mark.

[Printing Ink]

A printing ink of the present invention comprises an acrylic resin and a coloring agent.

There is no limitation to the acrylic resin used in the present invention, and the following acrylic resin may be used; an acrylic polyurethane resin, a (meth)acrylate resin, a thermoplastic acrylic resin, a thermosetting acrylic resin, or an acrylic silicone resin. Among these resins, an acrylic polyurethane resin is preferred in view of the adhesion to the clear coat applied over the mark defined by the ink and durability of the mark. Now these resins will be described below individually.

First, an acrylic polyurethane resin will be described. An acrylic polyurethane resin is a two-part type acrylic resin comprising acrylic polyol and isocyanate, wherein a base material containing acrylic polyol is mixed with a curing agent containing isocyanate before printing, thereby to cause the addition reaction between a OH group of acrylic polyol and an isocyanate group (NCO group) to form a film having an urethane bond.

The acrylic polyol is a copolymer or oligomer having a plurality of hydroxyl groups, which is obtained by copolymerizing (meth)acrylic monomer having OH group, e.g. β-hydroxylethyl methacrylate, with (meth)acrylic acid and/or (meth)acrylate.

The usable isocyanate preferably has two or more isocyanate groups and examples thereof include aliphatic, alicyclic, aromatic and aromatic aliphatic diisocyanate compounds, such as hexamethylene diisocyanate, xylylene diisocyanate, hydrogenated xylylene diisocyanate, isophorone diisocyanate, tetramethyl xylylene diisocyanate, hydrogenated diphenylmethane diisocyanate, and tolylene diisocyanate. These isocyanates may be used alone or in combination. Among these compounds, hexamethylene diisocyanate is preferably used in view of the adhesion to the clear coat applied over the printed mark on a surface of a ball body and durability of the mark.

A ratio of a NCO group to a OH group, NCO/OH, may be determined according to the curing rate and durability required, and is preferably in a range, for example, from 0.5 to 2.0, more preferably in a range from 0.9 to 1.5. When the proportion of NCO is lower, the resin takes a longer time to cure thus resulting in a lower productivity. When the proportion of NCO is higher, the resin may begin to cure before being used in printing after the base material and the curing agent are mixed, resulting in lower adhesion between ink and the surface of the golf ball body. To prevent such problems, it is necessary to reduce the time interval from mixing to printing, which in turn reduces the margin allowed in the time control during the production process. The coloring agent may be added to the base material or to the curing agent in advance, or may be added when the base material and the curing agent are mixed. Preferred is adding the coloring agent to the base material in advance in view of the productivity.

Next, a (meth)acrylate resin will be described. A (meth)acrylate resin is obtained by the polymerization of acrylate and/or methacrylate and is superior in adhesion and flexibility. Usable acrylate and methacrylate include, for example, methyl (meth)acrylate, ethyl (meth)acrylate, isopropyl (meth)acrylate, n-butyl (meth)acrylate, isobutyl (meth)acrylate, n-amyl (meth)acrylate, isoamyl (meth) acylate, n-hexyl (meth)acrylate, 2-ethylhexyl (meth)acrylate, and n-octyl (meth)acrylate. The (meth)acrylate refers to acrylate or methacrylate.

A thermoplastic acrylic resin is a (meth)acrylate based copolymer obtained by copolymerizing a (meth)acrylate and vinyl monomer, which does not contain a curable functional group and is plasticized by heating. The kind of monomer, proportion of vinyl monomer and polymerization degree of the copolymer may be controlled to obtain physical properties required to ink. Examples of the (meth)acrylate listed as for the (meth)acrylate resin may be used for the thermoplastic acrylic resin.

A thermosetting acrylic resin includes those obtained by copolymerizing (meth)acrylate and a non-functional monomer such as styrene, as a base component, with a monomer having a functional group such as carboxyl group, epoxy group, or methylol group, as an essential component. The thermosetting acrylic resin is preferably used with a crosslinking agent such as an amino resin, epoxy resin, polyisocyanate, and phenol resin. A functional group of the crosslinking agent is reacted with a functional group of the thermosetting acrylic resin, thereby to cure with heating to form a film. Desired physical properties of ink can be obtained by controlling the proportion of the functional group of the thermosetting acrylic resin to that of crosslinking agent.

An acrylic silicone resin is obtained by reacting an acrylic resin, prepared by polymerizing a (meth)acrylic acid derivative, with a silicone resin having a silanol group and an alkoxy group. The acrylic silicone resin is cured by condensation reaction in the presence of water in an air, or cured by using isocyanate.

The amount of the acrylic resin in ink of the present invention is not specifically limited, but is preferably in a range from 5 to 60 parts by mass, and more preferably from 10 to 40 parts by mass, based on 100 parts by mass of the whole ink. In case where the amount of the acrylic resin is smaller than 5 parts by mass, the adhesion between ink and the cover made from ionomer resin is liable to be lowered. On the other hand, when the amount is larger than 60 parts by mass, chromaticity of the resultant mark is lowered and it becomes necessary to apply ink in high thickness so as to prevent such a problem. In case that an acrylic polyurethane resin is employed as acrylic resin, the total amount of acrylic poylol and isocyanate is the same as that of the acrylic resin.

The coloring agent used in the present invention is not specifically limited, and conventional pigments or dye may be used as the coloring agent. Usable coloring agents include, for example, black pigments such as carbon black, acetylene black, lamp black, and aniline black; yellow pigments such as chrome yellow, zinc yellow, cadmium yellow, yellow oxide, mineral fast yellow, nickel titanium yellow, navels yellow, naphthol yellow S, Hansa yellow G, Hanza yellow 10G, benzidine yellow G, benzidine yellow GR, quinoline yellow lake, permanent yellow NCG, and tartrazine lake; orange pigments such as chrome orange, molybdenum orange, permanent orange GTR, pyrazolone orange, vulcan orange, indanthrene brilliant orange RK, benzidine orange G, and indanthrene brilliant orange GK; red pigments such as red iron oxide, cadmium red, red lead oxide, cadmium mercury sulfide, permanent red 4R, lithol red, pyrazolone red, watching red calcium salt, lake red D, brilliant carmine 6B, eosin lake, rhodamine lake B, alizarin lake, and brilliant carmine 3B; violet pigments such as manganese violet, fast violet B, and methyl violet lake; blue pigments such as marine blue, cobalt blue, alkali blue lake, victoria blue lake, phthalocyanine blue, metal-free phthalocyanine blue, partially chlorinated phthalocyanine, fast sky blue, and indanthrene blue BC; green pigments such as chrome green, chrome oxide, pigment green B, malachite green lake, and fanal yellow green; white pigments such as zinc white, titanium oxide, antimony white, and zinc oxide, baryte powder, barium carbonate, clay, silica, white carbon, talc, and alumina white.

The amount of the coloring agent in ink of the present invention is not specifically limited, but may be determined according to the concentration of the resultant mark, and is preferably in a range from 1 to 50 parts by mass, and more preferably in a range from 5 to 30 parts by mass, based on 100 parts by mass of the whole ink.

If necessary, ink of the present invention may contain auxiliaries such as curing agents, solvents, diluents, antioxidants, and ultraviolet absorbers, in addition to the acrylic resins and coloring agents described above. These auxiliaries may serve as an essential agent, sometimes, depending on the kind of the acrylic resins. When using the thermoplastic acrylic resin, a solvent to dissolve the resin is required. When using the thermosetting acrylic resin, a crosslinking agent and a solvent to dissolve the resin are required. When using the acrylic silicone resin, a crosslinking agent is required.

The crosslinking agent is not specifically limited, and examples thereof include amino resin, epoxy resin, isocyanate, and phenol resin. Among these, isocyanate is preferred.

The solvent may be any one which dissolves the acrylic resin, and examples thereof include aromatic hydrocarbons such as cyclohexane, propylene glycol monomethyl ether acetate, butanol, cellosolve, cyclohexanone, 3-methoxy-3-methylbutyl acetate, n-butyl acetate, benzene, xylene, and toluene. The amount of the solvent is preferably in a range from 20 to 80 parts by mass, and more preferably from 30 to 60 parts by mass, based on 100 parts by mass of the whole ink. In case where the amount is smaller than 20 parts by mass, the viscosity increased, resulting in poor workability. Also the dispersion of the acrylic resin and coloring agent is liable to be lowered. On the other hand, when the amount is larger than 80 parts by mass, it takes a long time to dry (cure) after printing on the surface of the ball body, resulting in poor productivity.

The antioxidant includes, for example, various antioxidants such as phenols, sulfur, and phosphorous antioxidants.

The ultraviolet absorber includes, for example, various ultraviolet absorbers such as benzophenones, benzotriazoles, acrylates, and salicylates ultraviolet absorbers.

Those components of ink can be mixed using a known apparatus such as V-type mixer, and ball mill or tumbler mixer.

A printing ink of the present invention makes it possible to print a mark directly on a surface of a ball body, especially the surface of an ionomeric cover without primer coat. The mark defined by the ink has higher durability by suppressed excessive adhesion between the mark and the clear coat applied over the mark.

[Golf Ball]

Now a golf ball of the present invention will be described.

As shown in FIG. 1, a golf ball of the present invention comprises a ball body 1 and a mark 3 printed on the surface 2 of the ball body 1 using ink of the present invention. Therefor the mark 3 is defined by ink comprising an acrylic resin and a coloring agent. The mark 3 is finished by drying and curing the printed ink on the surface of the ball body.

Figure 2:
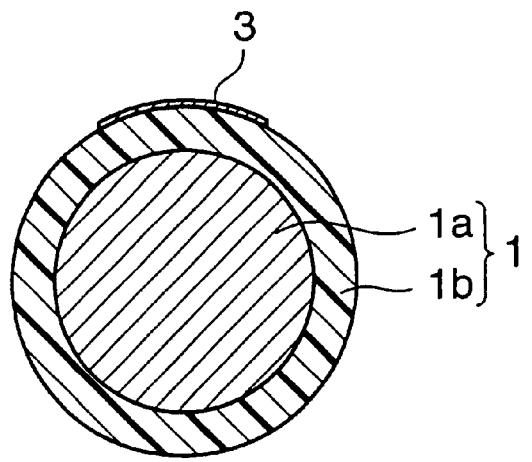
FIG. 2 is a cross sectional view showing a golf ball embodying the present invention.
Figure 3:
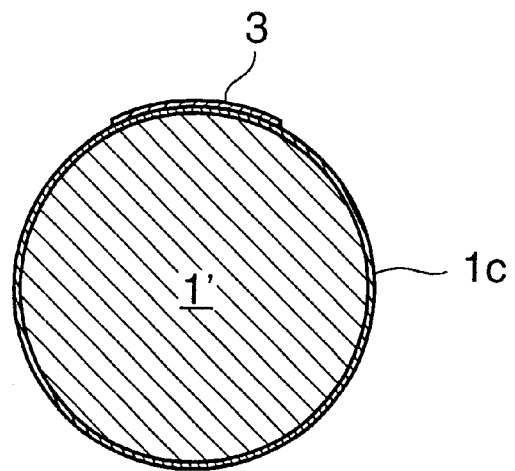
FIG. 3 is also a cross-sectional view of a golf ball embodying the present invention, as is FIG. 4 also.

The ball body 1, in the case of one-piece golf ball, is made from vulcanized rubber. In the case of a multi-piece solid golf ball such as two-piece golf ball and three-piece golf ball, or a thread-wound golf ball, as shown in FIG. 2, the ball body 1 has a core 1a and a cover 1b over the core 1a. The core 1a of multi-piece solid golf ball is made from vulcanized rubber. The cover 1b is made from resin composition. The mark 3 is directly formed on the surface of the vulcanized rubber body in the case of one-piece golf ball, or on the surface of the cover 1b in the case of a multi-piece solid golf ball or a thread-wound golf ball. As shown in FIG. 3, the mark 3 may be formed on the surface of primer coat 1c of the primer coated ball body 1'. The mark 3 defined by the ink of the present invention adheres well to the resin cover 1b or rubber body as well as to the primer coat 1c with the prior art.

Specific examples of the resin composition, which is material of the cover 1b, include ionomer resin; polyurethane-, polyamide-, and polyester-based thermoplastic elastomer; and a combination thereof. Preferable examples of the ionomer include copolymers of ethylene and (meth)acrylic acid with carboxylic acid groups neutralized by a metal ion, and terpolymers of ethylene, (meth)acrylic acid and (meth)acrylate with carboxylic acid groups neutralized by a metal ion. Useful metal ions for neutralizing the copolymer or the terpolymer include, for example, monovalent metal ions such as sodium ion, potassium ion, and lithium ion; divalent metal ions such as zinc ion, calcium ion, magnesium ion, copper ion, and manganese ion; and trivalent metal ions such as aluminum ion, and neodymium ion. A sodium ion, a lithium ion and a magnesium ion are preferably used because a rigid ionomer having high hardness and high resilience can be obtained.

The vulcanized rubber, which is material of a one-piece ball body or a solid core of multi-piece solid golf ball, is obtained by vulcanizing a rubber composition comprising a diene rubber as a base rubber, an organic peroxide as a crosslinking agent, an unsaturated carboxylic acid and/or a metal salt thereof as a co-crosslinking agent, and optional additives such as specific gravity adjustors, antioxidants, plasticizers, dispersants, ultraviolet absorbers, coloring agents, and peptizer.

The base rubber may be natural or synthetic rubber as far as it is a diene rubber. The synthetic rubber includes, for example, ethylene-propylene-diene terpolymer (EPDM), butadiene rubber (BR), isoprene rubber (IR), styrene-butadiene rubber (SBR), and acrylonitrile-butadiene rubber (NBR), and these rubber may be use alone or in combination. Among these rubbers, a so-called high-cis 1,4-polybutadiene rubber having 40% or more, preferably 80% or more, of a cis structure may be preferably used.

The organic peroxide includes dicumyl peroxide, 1,1-bis (t-butylperoxy)-3,5-trimethylcyclohexane, 2,5-dimethyl-2, 5-di(t-butylperoxy)-hexane, and di-t-butyl peroxide. Among these organic peroxides, dicumyl peroxide is preferably used. The amount of the organic peroxide is preferably in a range from 0.3 to 2.0 parts by mass, and particularly preferably from 0.5 to 2.0 parts by mass, based on 100 parts by mass of the base rubber.

The unsaturated carboxylic acid and/or metal salt thereof include, for example, α,β-unsaturated carboxylic acids having 3 to 8 carbon atoms, such as acrylic or methacrylic acid, and monovalent or divalent metal salts thereof, such as zinc salt and magnesium salt. Zinc acrylate capable of imparting high resilience is preferably used. The amount of the metal salt of the unsaturated carboxylic acid is preferably in a range from 10 to 40 parts by mass, and particularly preferably from 10 to 30 parts by mass, based on 100 parts by mass of the base rubber.

In case where the amount is larger than 40 parts by mass, a crosslinked structure becomes too dense to control the hardness to 75 or less. On the other hand, in case where the amount is smaller than 10 parts by mass, the resulting golf ball can not maintain intrinsic resilience.

The specific gravity adjustor includes, for example, inorganic salts such as zinc oxide, barium sulfate, and calcium carbonate; high-specific gravity metal powder such as tungsten, and molybdenum powder; and a mixture thereof. The antioxidant includes, for example, phenols.

Figure 4:
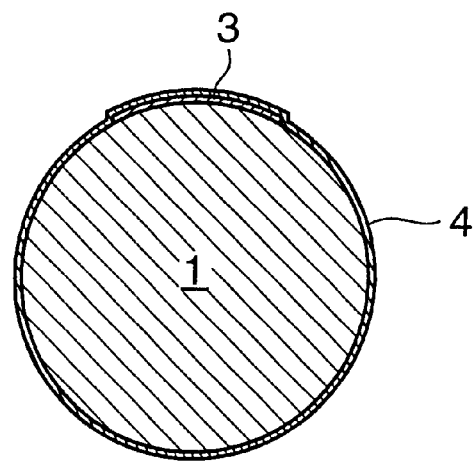

According to the present invention, as shown in FIG. 4, preferable golf ball has a clear coating layer 4 formed on the mark 3 and the surface of the ball body 1. A clear coat may be applied over the cured ink (i.e. mark) and the entire ball body in order to protect the mark, while giving a gloss to the golf ball for better appearance. In view of higher durability of the mark, non-primer coated ball body is preferred. This is because excessive adhesion between a mark and a clear coat applied over the mark is suppressed by forming the mark directly on the surface of non-primer coated ball body, especially ionomeric cover surface.

The suitable clear coating material is a two pack polyurethane, consisting of separate package of a polyol having a plurality of OH groups, and a polyisocyanate having a plurality of NCO groups. The polyol includes, for example, polyester polyol, polyether polyol, acrylic polyol, and epoxy polyol. The isocyanate includes, for example, tolylene diisocyanate, diphenylmethane diisocyanate, xylylene diisocyanate, and hexamethylene diisocyanate. The clear coat is preferably applied in a single layer for economical consideration.

[Printing Method]

A printing method of the present invention comprises the steps of (a) transferring an inventive ink to a pad, and (b)printing a mark on a surface of a ball body with the inked pad. The inventive printing method is characterized by using ink comprising acrylic resin and a coloring agent, and employing a pad printing technique.

As for the ink, acrylic polyurethane employed as an acrylic resin in the ink is preferred. The curing reaction of the acrylic polyurethane begins upon mixing of acrylic polyol and isocyanate. Since the mixing procedure of these components should be conducted before the step (a) of transferring, it is necessary to print (step (b)) within a predetermined period of time after mixing, while giving consideration to the mixing proportions of these components.

Pad printing technique is more suitable than screen printing technique, because it is difficult to print a mark on such a spherical surface as that of a golf ball body with dimples formed thereon by screen printing technique. Furthermore the ink described above can be transferred to a pad more easily than conventional ink.

The step (b) is printing a mark directly on the surface of the non primer coated ball body, or printing a mark on a primer coat of the primer coated ball body. The former printing is preferred, because the process of applying the primer coat can be eliminated with lower material cost and improved productivity. On the other hand, when drying time of the primer coat is shortened or the drying temperature of the primer coat is low, the mark may be printed on an insufficient cured primer coat, thus leading to poor adhesion between the primer coat and the mark, resulting in lower durability of the mark.

According to a preferable printing method of the present invention, the mark is directly printed on a surface of the ball body made from vulcanized rubber in case of one-piece golf ball, alternatively the mark is directly printed on a surface of a cover made from resin in case of multi-piece golf ball or thread-wound golf ball. The surface of the ball body made from vulcanized rubber and the cover made of resin such as ionomer resin may be prepared to promote ink and paint adhesion e.g. by sand blasting The ink on the printed golf ball will dry by leaving to stand at a predetermined temperature for a predetermined period of time. There are no limitations to the curing temperature and the curing time, while the curing temperature is preferably in a range from 10 to 70° C. and the curing time is preferably in a range from one minute to 60 hours.

EXAMPLES

The present invention is further illustrated by the following examples and comparative examples. It is to be understood that the present invention is not limited to the examples, and various changes and modifications may be made in the invention without departing from the spirit and scope thereof. In the following examples and comparative examples, parts and percentages are by mass unless otherwise stated.

Examples 1

Ink comprising 10 parts of phthalocyanine blue as a pigment, 26 parts of acrylic polyol and 13 parts of hexamethylene diisocyanate as an acrylic resin, and 20 parts of cyclohexanone, 16 parts of propylene glycol monomethyl ether acetate and 15 parts of n-butyl acetate as a solvent was prepared. Ink was prepared by mixing phthalocyanine blue, acrylic polyol, cyclohexanone and propylene glycol monomethyl ether acetate to form a base material, and mixing hexamethylene diisocyanate and n-butyl acetate as a curing agent with the base material.

A mark was printed on a cover made from ionomer resin using ink prepared as described above by the pad printing techniques, and a clear coat was applied over the mark and the surface of the cover, thereby finishing a golf ball.

The resulting golf ball was subjected to an impact resistance test and a wear resistance test as described below, thereby to evaluate the adhesion of ink to the golf ball cover made from ionomer resin. Test results are shown in Table 1.

Impact Resistance

The golf ball was hit with W#1 at a head speed of 45 m/sec, repetitively 200 times, using a swing robot manufactured by True Temper Co., to evaluate the extend of peel off of the mark by the following criteria.

◎: Mark does not peel off.
○: Mark peels off less than 1 mm.
Δ: Mark peels off over 1 to 2 mm.
x: Mark peels off more than 2 mm.

Wear Resistance

The golf ball was subjected to repetitive bunker shot 50 times using the swing robot described above, thereby to evaluate the extend of wearing off of the mark by the following criteria.

◎: No missing or blurred portion of mark due to wear off.
○: Mark is slightly blurred due to wear off.
Δ: Some missing or blurred portion of mark due to wear off.
x: Mark is missing or blurred due to wear off.

Comparative Example 1

A golf ball was produced in the same manner as in Example 1, except that a nitrocellulose resin of nitrocellulose and polyester polyol was used in place of acrylic polyol, and then evaluated. The results are shown in Table 1.

Comparative Example 2

A primed coat was applied on the cover of the ball body. A mark was printed on the surface of the primer coated ball body using the same ink as in Comparative Example 1. Then a clear coat was applied over the mark and the surface of the ball body (i.e. primer coat), thereby finishing a golf ball. The evaluation was conducted in the same manner as in Example 1. The results are shown in Table 1.

Example 2

A mark was printed on the surface of the primer coated cover using the same ink as in Example 1. Then a clear coat was applied over the mark and the surface of the ball body (i.e. primer coat), thereby finishing a golf ball. The evaluation was conducted in the same manner as in Example 1. The results are shown in Table 1.

TABLE 1

|  | Example 1 | Comp. Example 1 | Comp. Example 2 | Example 2 |
|---|---|---|---|---|
| Acrylic polyol | 26 | — | — | 26 |
| Hexamethylene diisocyanate | 13 | 13 | 13 | 13 |
| Nitrocellulose resin | — | 26 | 26 | — |
| Coloring agent | 10 | 10 | 10 | 10 |
| Solvent |  |  |  |  |
| Cyclohexanone | 20 | 20 | 20 | 20 |
| Propylene glycol monomethyl ether acetate | 16 | 16 | 16 | 16 |
| n-butyl acetate | 15 | 15 | 15 | 15 |
| Impact resistance | ◎ | ○ | ○ | ◎ |
| Wear resistance | ◎ | Δ ~ X | X | Δ |

The golf ball of Example 1 having the mark defined by the ink of the present invention directly on the ionomeric cover showed good results in both impact resistance and wear resistance. In the case of the golf ball of Comparative Example 1 using nitrocellulose ink, missing portion and blurred portion of the mark were observed as the clear paint worn off. In the case of the golf ball of Comparative Example 2 having the mark printed on the primer coat using the same ink as in Comparative Example 1, missing portion and blurred portion of the mark were observed more conspicuously than Comparative Example 1. The golf ball of Example 2 having the mark printed on the primer coat using the same ink as in Example 1, showed excellent impact resistance, while the wear resistance was lower than that of Example 1, but higher than that of Comparative Examples 1 and 2. As can be seen from these results, the inventive ink adheres well to the ionomeric cover as well as the primer coat. Furthermore the inventive ink adheres stronger to the ionomeric cover than to clear coat applied over the cured ink.

The present invention has been described with reference to the present embodiments. Obviously, modifications and alterations will occur to others upon reading and understanding the proceeding detailed description. It is indeed that the present invention be construed as including all such modifications and alterations insofar as they come within the scope of the attended claims or the equivalents thereof.

What is claimed is:

1. A printing ink for a golf ball, comprising an acrylic resin and a coloring agent, wherein the acrylic resin includes acrylic polyol containing a hydroxyl group and isocyanate.

2. A printing ink for golf ball according to claim 1, wherein the acrylic resin is present in an amount of 5 to 60 parts by mass based on 100 parts by mass of the ink.

3. A printing ink for golf ball according to claim 2, wherein the coloring agent is present in an amount of 1 to 50 parts by mass based on 100 parts by mass of the ink.

4. A golf ball comprising
   a ball body, and
   a mark printed on a surface of the ball body, the mark being defined by ink comprising an acrylic resin and a coloring agent. wherein the acrylic resin includes acrylic polyol containing a hydroxyl group and isocyanate, and said resin is cured at a temperature of 10° to 70° C. after being printed on the surface of the ball body.

5. A golf ball according to claim 4,
   wherein the ball body entirely is made from vulcanized rubber,
   and the mark is printed directly on the surface of the ball body.

6. A golf ball according to claim 4,
   wherein the ball body has a core and a cover over the core, the cover made from ionomer resin,
   and the mark is printed directly on the surface of the cover.

7. A golf ball according to claim 4, further comprising a clear coat applied over the mark and the surface of the ball body.

8. A printing method comprising the steps of:
   transferring an ink to a pad, the ink comprising an acrylic resin wherein the acrylic resin comprises acrylic polyol containing a hydroxyl group and isocyanate and a coloring agent;
   printing a mark on a surface of a ball body with the inked pad and curing the printed mark at the temperature of 10° to 70° C.

9. A printing method according to claim 8, wherein the ball body entirely is made from vulcanized rubber, the mark is directly printed on a surface of the ball body.

10. A printing method according to claim 8, wherein the ball body has a core and a cover over the core, the mark is directly printed on a surface of the cover.

11. A printing method according to claim 8, further comprising curing the printed mark.

12. A printing method according to claim 11, wherein the curing is conducted at the temperature of 10 to 70° C.

13. A printing method according to claim 12, wherein the curing is conducted for one minute to 60 hours.

14. A printing method according to claim 11, wherein the curing is conducted for one minute to 60 hours.

15. A golf ball comprising
    a ball body, and
    a mark printed on a surface of the ball body, the mark being defined by ink comprising an acrylic resin and a coloring agent, wherein the acrylic resin includes acrylic polyol and isocyanate, and said resin is cured at the temperature of 10 to 70° C. after being printed on the surface of the ball body.

16. A golf ball comprising
    a ball body, and
    a mark printed on a surface of the ball body, the mark being defined by ink comprising an acrylic resin and a coloring agent, wherein the acrylic resin includes acrylic polyol and isocyanate, and said resin is cured for one minute to 60 hours after being printed on the surface of the ball body.

17. A printing method comprising the steps of:
    transferring ink to a pad, the ink comprising an acrylic resin wherein the acrylic resin includes acrylic polyol and isocyanate and a coloring agent;
    printing a mark on a surface of a ball body with the inked pat; and
    curing the printed mark at the temperature of 10 to 70° C.

18. A printing method comprising the steps of:
    transferring ink to a pad, the ink comprising an acrylic resin wherein the acrylic resin includes acrylic polyol and isocyanate and a coloring agent;
    printing a mark on a surface of a ball body with the inked pad; and
    curing the printed mark for one minute to 60 hours.

* * * * *